(12) United States Patent
Sugioka

(10) Patent No.: US 7,284,001 B2
(45) Date of Patent: Oct. 16, 2007

(54) DATA FILE SYSTEM, DATA ACCESS NODE, BRAIN NODE, DATA ACCESS PROGRAM STORAGE MEDIUM AND BRAIN PROGRAM STORAGE MEDIUM

(75) Inventor: Kiyoshi Sugioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 10/816,922

(22) Filed: Apr. 5, 2004

(65) Prior Publication Data

US 2005/0071338 A1 Mar. 31, 2005

(30) Foreign Application Priority Data

Sep. 30, 2003 (JP) ............... 2003-341130

(51) Int. Cl.
*G06F 17/30* (2006.01)
(52) U.S. Cl. .............. 707/9; 707/10; 707/2; 707/3; 707/6
(58) Field of Classification Search ............ 707/9
See application file for complete search history.

(56) References Cited

U.S. PATENT DOCUMENTS

| | | | |
|---|---|---|---|
| 5,548,724 A * | 8/1996 | Akizawa et al. | 709/203 |
| 5,603,003 A * | 2/1997 | Akizawa et al. | 711/114 |
| 5,649,102 A * | 7/1997 | Yamauchi et al. | 709/213 |
| 6,418,441 B1 * | 7/2002 | Call | 707/10 |
| 6,490,583 B2 * | 12/2002 | Tada et al. | 707/9 |
| 6,594,654 B1 * | 7/2003 | Salam et al. | 707/3 |
| 2002/0002589 A1 * | 1/2002 | Yonenaga et al. | 709/206 |
| 2003/0028639 A1 * | 2/2003 | Yamamoto et al. | 709/225 |
| 2003/0090502 A1 * | 5/2003 | Yuasa et al. | 345/700 |
| 2004/0186826 A1 * | 9/2004 | Choi et al. | 707/3 |

FOREIGN PATENT DOCUMENTS

| | | |
|---|---|---|
| JP | 5-101018 | 4/1993 |
| JP | 5-241934 | 9/1993 |
| JP | 6-332782 | 12/1994 |
| JP | 6-348663 | 12/1994 |

\* cited by examiner

*Primary Examiner*—Don Wong
*Assistant Examiner*—Binh V Ho
(74) *Attorney, Agent, or Firm*—Staas & Halsey LLP

(57) ABSTRACT

The present invention provides a data file system with the processing speed being improved, a data access node, a brain node, a data access program storage medium and a brain program storage medium. A brain node receives a data access request a from a NAS client computer, refers to an association table in a hard disk to identify a data access node among data access nodes, and transmits a data access request to the data access node. The data access node accesses data designated by the data access request stored in a hard disk which the node is responsible for accessing and transmits the access result to the requesting NAS client computer.

4 Claims, 11 Drawing Sheets

121a

| NODE ID | DATA ID | PROTOCOL ID | VALID/INVALID |
|---|---|---|---|
| 1 | 1001 ⋮ 1999 | NFS | 1 |
| 2 | 2001 ⋮ 2999 | NFS | 0 |
| 3 | 3001 ⋮ 3999 | CIFS | 1 |

Fig.5

DATA FILE SYSTEM, DATA ACCESS NODE, BRAIN NODE, DATA ACCESS PROGRAM STORAGE MEDIUM AND BRAIN PROGRAM STORAGE MEDIUM

BACKGROUND OF THE INVENTION

1. Field of the Invention

The present invention relates to a data file system that allows plural clients to share a data file and access the data file simultaneously, and a data access node, a brain node, a data access program storage medium that stores a data access program and a brain program storage medium that stores a brain program, which are included in the data file system.

2. Description of the Related Art

Conventionally, simultaneous data sharing type data file systems, which allow plural clients to share a data file and access the data file simultaneously, have been known. As an example of such data file systems, there is proposed a network file sharing system that performs file processing by assigning file access requests from the clients to their respective dedicated processors and returns the results to the clients, thereby avoiding performance degradation of the file server even if the number of clients increases (see patent reference 1).

Besides, there is proposed a technique that provides a server with a virtual file system which receives file access requests from the clients, thereby facilitating file management involving a system modification or file transport required due to addition of another server or the like (see patent reference 2).

Furthermore, there is proposed a technique that avoids concentration of accesses to a particular file server by a master file server receiving file access requests from the clients and assigning the requests to a file server loaded lightly (see patent reference 3).

Furthermore, there is proposed a technique that involves plural terminals which make processing requests, plural servers which carry out the processing requests and a master computer which assigns the processing requests to the respective servers, in which a server loaded lightly informs the master computer of its lightly loaded condition, and the master computer determines to which server the next processing is assigned based on the information (see patent reference 4).

Patent reference 1: Japanese Patent Laid-Open No. 5-101018

Patent reference 2: Japanese Patent Laid-Open No. 5-241934

Patent reference 3: Japanese Patent Laid-Open No. 6-332782

Patent reference 4: Japanese Patent Laid-Open No. 6-348663

Conventional simultaneous data sharing type data file systems have the problems described below. Now, the problems will be described with reference to FIG. 12.

FIG. 12 shows a configuration of a conventional simultaneous data sharing type data file system.

A data file system 3 shown in FIG. 12 has network attached storage (NAS) clients 1300 and 1400 connected to a communication line 1600 of a local area network (LAN) and a computer 1000.

The NAS clients 1300 and 1400 are computers that perform data transfer using the network file system (NFS) protocol used with UNIX (registered trademark), the common internet file system (CIFS) protocol used with Windows (registered trademark) or the like.

The computer 1000 has an MDS (Meta Data Server) node 1100, an NFS server 1200 and a disk device 1500. The disk device 1500 has a hard disk 1501 that stores metadata 1501$a$ and a hard disk 1502 that stores data 1502$a$ constituting a data file. The meta data 1501$a$ is data describing information about the data file (file name, address, size, update history or the like).

In the MDS node 1100, a server application that manages data (referred to as a data management application) runs. Besides, the NFS server 1200 is a software server in which a server application for accessing data (referred to as a data access application) runs. In the NFS server 1200, data transfer is conducted according to the NFS protocol.

In the data file system 3 thus configured, the NAS client 1300 accesses a data file composed of data stored in the hard disk 1502 in the following manner, for example.

First, the NAS client 1300 sends an access request a to access the data file to the NFS server 1200.

Upon receiving the access request a, the NFS server 1200 sends an acquisition request b to acquire a file attribute, a lock or the like to the MDS node 1100. Here, the "lock" is the right to use a file, which enables a user to inhibit another user from using the file the user uses at that time.

In response to the acquisition request b, the MDS node 1100 accesses the metadata 1501$a$ and transmits data c describing the file attribute or the like to the NFS server 1200.

Based on the data c transmitted from the MDS node 1100, the NFS server 1200 reads the data in the data 1502$a$ stored in the hard disk 1502 via a path d and transmits the read data to the NAS client 1300 as a data file e. In this way, the data file e designated by the access request a is transferred to the NAS client 1300 that had made the access request a.

In the conventional simultaneous data sharing type data file system 3 described above, however, the data management application and the data access application run simultaneously on one computer 1000. Therefore, the conventional simultaneous data sharing type data file system is inferior in normal access performance to file systems not allowing simultaneous data sharing, which are currently widely used.

In the example described with reference to FIG. 12, one NFS server 1200 is provided. However, in general, conventional simultaneous data sharing type data file systems have plural NFS servers besides the NFS server 1200. Therefore, the MDS node 1100, at which access requests from the plural NFS servers are concentrated, has to conduct arbitration among the servers and, thus, is highly burdened. In addition, the data accesses from the plural NFS servers and CIFS servers are concentrated at the hard disk 1502. Thus, there is a problem that the whole system is degraded in access performance, and it is difficult to increase the scale (scalability) of the system.

Furthermore, if a CIFS server is provided besides the NFS server 1200, arbitration among the servers has to be conducted taking into consideration the difference in protocol between the servers, and thus, there is a problem that the processing mechanism is complicated.

Furthermore, if the disk device is expanded to accommodate more data files, the disk device configuration set in the servers has to be modified. Furthermore, if a bulk disk device is connected to the system, the data accesses from the servers are concentrated at the disk device, resulting in degraded access performance. Thus, there is a problem that it is difficult to connect a bulk disk device to the system.

As described above, in the conventional data file system 3, the computer 1000 is relatively highly burdened, which is a bottle neck that inhibits enhancement of processing speed and network communication speed in the data file system.

SUMMARY OF THE INVENTION

In view of such circumstances, an object of the present invention is to provide a data file system with an enhanced processing speed, a data access node, a brain node, a data access program storage medium that stores a data access program, and a brain program storage medium that stores a brain program.

A data file system according to the present invention that attains the object has:

plural data access nodes which access data which the data access nodes are responsible for accessing respectively; and a brain node having:

an association table management section which manages an association table which describes an association between node IDs for discriminating among the plural data access nodes and data IDs each for identifying data which a data access node identified by a node ID is capable of accessing;

a request reception section which receives a data access request from a client;

a node search section which refers to the association table to search for a data access node which is capable of accessing the data for which the data access request is intended; and a request transmission section which transmits the data access request to the data access node which is capable of accessing the data for which the data access request is intended, and is characterized in that each of the plural data access nodes has:

a request reception section which receives the data access request transmitted from the brain node;

a data access section which accesses the data designated by the data access request received at the request reception section of each of the data access nodes; and a result transmission section which transmits the result of the data access by the data access section to the client which has made the data access request.

In the data file system according to the present invention, the brain node serves to transmit a data access request to the data access node which can access the data for which the data access request from the client is intended, and the data access node serves to access the data designated by the data access request transmitted from the brain node and transmit the result to the requesting client. In other words, the brain node serves only to assign the request from the client to the data access node associated with the request, and the data access node serves only to access the data which the data access node is responsible for accessing of the whole data of the system. In this way, the brain node and the data access node, which are software servers, are responsible for different functions, and the data access nodes divide access processing among them. Therefore, compared to the conventional technique described with reference to FIG. 12, the processing speed is improved.

Preferably, the association table management section manages an association table that describes an association between the node IDs and protocol IDs each for identifying an access protocol used by a data access node identified by a node ID in addition to the association between the node IDs and the data IDs, and if the data access request received by the request reception section is a request to create a new data file, the request transmission section transmits the data access request to a data access node that uses an access protocol suitable for the protocol of the data access request.

If the data access request is transmitted to a data access node that uses an access protocol suitable for the protocol of the data access request when the data access request is a request to create a new data file as described above, each data access node may use a different access protocol, so that a flexible system is provided which allows plural access protocols to coexist therein.

A data access node that attains the object described above is a data access node which accesses data which the data access node is responsible for accessing, having:

a request reception section which receives a data access request transmitted thereto from a brain node which receives a data access request from a client;

a data access section which accesses data designated by the data access request received at the request reception section; and a result transmission section which transmits the result of the data access by the data access section to the client which has made the data access request.

Since the data access node according to the present invention accesses the data which the node is responsible for accessing and transmits the access result to the requesting client, it is sufficient that the data access node accesses only the data files thereof and conducts arbitration only among the access requests to the data files thereof. Thus, distributed processing is realized in the whole system, and the system performance can be improved. In addition, since addition of another data access node promotes distributed processing, the scale of the system can be readily enlarged while maintaining high system performance (higher scalability is provided).

A brain node according to the present invention that attains the object described above is a brain node which is connected to plural data access nodes which access data which the data access nodes are responsible for accessing respectively and transmits a data access request to a data access node of the plural data access nodes which is responsible for accessing a desired data, having:

an association table management section which manages an association table which describes an association between node IDs for discriminating among the plural data access nodes and data IDs each for identifying data which a data access node identified by a node ID is capable of accessing;

a request reception section which receives a data access request from a client;

a node search section which refers to the association table to search for a data access node which is capable of accessing the data for which the data access request is intended; and a request transmission section which transmits the data access request to the data access node which is capable of accessing the data for which the data access request is intended.

Since the brain node according to the present invention transmits (assigns) the data access request to the data access node that can access the data for which the data access request from the client is intended, the brain node is burdened relatively lightly compared to the conventional technique described with reference to FIG. 12. Thus, the access performance is improved, and the response to the data access request from the client is improved.

Preferably, the association table management section in the brain node according to the present invention manages an association table that describes an association between the node IDs and protocol IDs each for identifying an access protocol used by a data access node identified by a node ID in addition to the association between the node IDs and the data IDs, and if the data access request received by the request reception section is a request to create a new data file, the request transmission section transmits the data access request to a data access node that uses an access protocol suitable for the protocol of the data access request.

In this case, each data access node may use a different access protocol, so that a flexible system is provided which allows plural access protocols to coexist therein.

A data access program storage medium according to the present invention that attains the object described above is a data access program storage medium storing a data access program which runs on an information processing device allowing a program to run thereon and makes the information processing device operate as a data access node which accesses data which the data access node is responsible for accessing, characterized in that the data access program makes the information processing device operate as a data access node having:

a request reception section which receives a data access request transmitted thereto from a brain node which receives a data access request from a client;

a data access section which accesses data designated by the data access request received at the request reception section; and a result transmission section which transmits the result of the data access by the data access section to the client which has made the data access request.

Since the data access program stored in the data access program storage medium according to the present invention runs on an information processing device allowing a program to run and makes the information processing device operate as the data access node which accesses the data which the node is responsible for accessing, the data access node can operate in such a manner that it accesses the data which the node is responsible for accessing and transmits the access result to the requesting client. Therefore, it is sufficient that the data access node accesses only the data files thereof and conducts arbitration only among the access requests to the data files thereof. Thus, distributed processing is realized in the whole system, and the system performance can be improved.

Furthermore, a brain program storage medium according to the present invention that attains the object described above is a brain program storage medium storing a brain program which runs on an information processing device allowing a program to run and makes the information processing device operate as a brain node which is connected to plural data access nodes which access data which the data access nodes are responsible for accessing respectively and transmits a data access request to a data access node of the plural data access nodes which is responsible for accessing a desired data, characterized in that the brain program makes the information processing device operate as a brain node having:

an association table management section which manages an association table which describes an association between node IDs for discriminating among the plural data access nodes and data IDs each for identifying data which a data access node identified by a node ID is capable of accessing;

a request reception section which receives a data access request from a client;

a node search section which refers to the association table to search for a data access node which is capable of accessing the data for which the data access request is intended; and a request transmission section which transmits the data access request to the data access node which is capable of accessing the data for which the data access request is intended.

Since the brain program stored in the brain program storage medium according to the present invention runs on an information processing device allowing a program to run and makes the information processing device operate as a brain node which is connected to plural data access nodes which access data which the data access nodes are responsible for accessing respectively and transmits a data access request to a data access node of the plural data access nodes which is responsible for accessing a desired data, the brain node operates in such a manner that it transmits the data access request to the data access node which can access the data designated by the data access request from the client. Therefore, the brain node transmits (assigns) the data access request to the data access node that can access the data for which the data access request from the client is intended, and the brain node is burdened relatively lightly. Thus, the access performance is improved, and the response to the data access request from the client is improved.

Preferably, in the brain program storage medium according to the present invention, the association table management section manages an association table that describes an association between the node IDs and protocol IDs each for identifying an access protocol used by a data access node identified by a node ID in addition to the association between the node IDs and the data IDs, and if the data access request received by the request reception section is a request to create a new data file, the request transmission section transmits the data access request to a data access node that uses an access protocol suitable for the protocol of the data access request.

In this case, each data access node may use a different access protocol, so that a flexible system is provided which allows plural access protocols to coexist therein.

In the data file system according to the present invention, the brain node serves only to assign the requests from the clients to their respective data access nodes, and the data access nodes serve only to access the data which the data access nodes are responsible for accessing respectively of the whole data in the system. In this way, the brain node and the data access node are responsible for different functions, and the data access nodes also divide access processing among them. Therefore, the processing speed is improved.

Since the data access node according to the present invention accesses the data which the node is responsible for accessing and transmits the access result to the requesting client, it is sufficient that the data access node accesses only the data files thereof and conducts arbitration only among the access requests to the data files thereof. Thus, distributed processing is realized in the whole system, and the system performance can be improved. In addition, since addition of another data access node promotes distributed processing, the scale of the system can be readily enlarged while maintaining high system performance (higher scalability is provided).

Furthermore, since the brain node according to the present invention transmits (assigns) a data access request to a data access node that can access the data for which the data access request from the client is intended, the brain node is burdened relatively lightly. Thus, the access performance is improved, and the response to the data access request from the client is improved.

Furthermore, since the data access program stored in the data access program storage medium according to the present invention makes the data access node operate in such a manner that it accesses the data which the node is responsible for accessing and transmits the access result to the requesting client, it is sufficient that the data access node accesses only the data files thereof and conducts arbitration only among the access requests to the data files thereof. Thus, distributed processing is realized in the whole system, and the system performance can be improved.

Since the brain program stored in the brain program storage medium according to the present invention makes the brain node operate in such a manner that it transmits the data access request to the data access node which can access the data designated by the data access request from the client. Therefore, the brain node is burdened relatively lightly, and the response to the data access request from the client is improved.

BRIEF DESCRIPTION OF THE DRAWINGS

FIG. 5 shows an association table managed by an association table management section of the brain node shown in FIG. 4;

DETAILED DESCRIPTION OF THE PREFERRED EMBODIMENTS

Now, embodiments of the present invention will be described.

Figure 1:
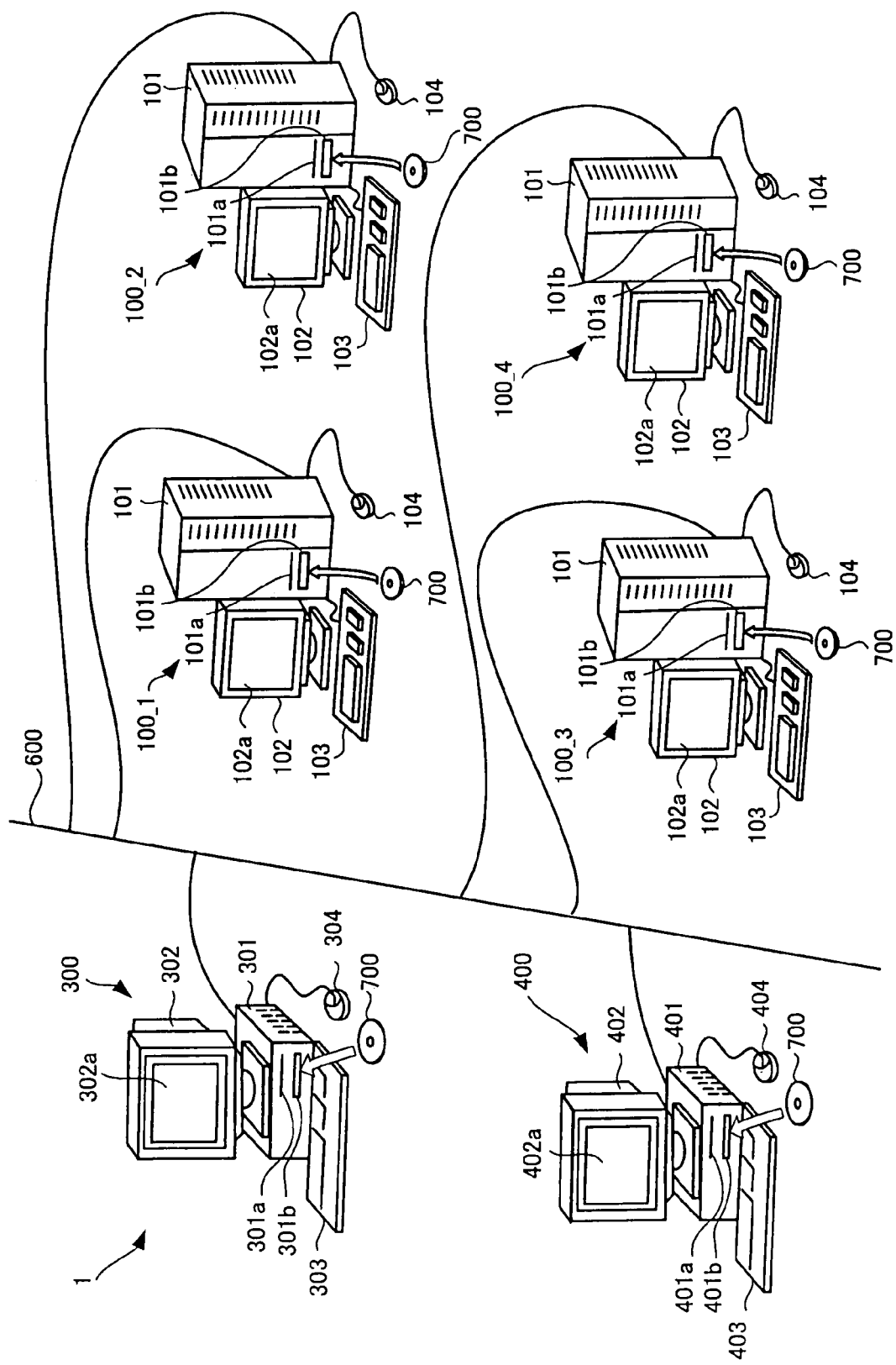
FIG. 1 is a schematic diagram showing a data file system according to a first embodiment of the present invention.

FIG. 1 is a schematic diagram of a data file system according to a first embodiment of the present invention.

As representatives, FIG. 1 shows six computers 100_1, 100_2, 100_3, 100_4, 300 and 400, which are connected to each other via a communication line 600. The computers 100_1, 100_2, 100_3, 100_4, 300 and 400 may be computers referred to as a workstation or personal computer. The communication line 600 may be any communication line, for example, the Internet or a local area network (LAN).

Of the computers 100_1, 100_2, 100_3 and 100_4, the computer 100_1 is composed of a pair of a brain node described later and a hard disk, and the computers 100_2, 100_3 and 100_4 are each composed of a pair of a data access node described later and a hard disk.

On the other hand, the computers 300 and 400 serve as client computers.

In the following, hardware configurations of these computers will be described first.

The four computers 100_1, 100_2, 100_3 and 100_4 each have a main section 101 incorporating a central processing unit (CPU), a random access memory (RAM), a hard disk, a communication board or the like, a display section 102 that displays an image or character sequence on a display screen 102*a* in response to an instruction from the main section 101, a keyboard 103 used for entering a user instruction to each of the computers 100_1, 100_2, 100_3 and 100_4, and a mouse 104 that designates an arbitrary point on the display screen 102*a* and allows entry of an instruction corresponding to an icon or the like displayed at that point at that time. Alternatively, another computer which has a display section, a keyboard and a mouse and collectively operates the computers 100_1, 100_2, 100_3 and 100_4 via the communication line 600 may be provided, rather than providing each of the four computers 100_1, 100_2, 100_3 and 100_4 with their own display section 102, the keyboard 103 and the mouse 104.

In addition, the main section 101 has, on the outside, a flexible disk insertion slot 101*a* through which a flexible disk (not shown) is loaded and a CD-ROM insertion slot 101*b* through which a CD-ROM 700 is loaded. Furthermore, the main section 101 incorporates a flexible disk drive and a CD-ROM drive that drive and access the flexible disk and the CD-ROM 700 loaded through the insertion slots 101*a* and 101*b*, respectively.

The computer 300 (400) has a main section 301 (401) incorporating a central processing unit (CPU), a random access memory (RAM), a hard disk, a communication board or the like, a display section 302 (402) that displays an image or character sequence on a display screen 302*a* (402*a*) in response to an instruction from the main section 301 (401), a keyboard 303 (403) used for entering a user instruction to the computer 300 (400), and a mouse 304 (404) that designates an arbitrary point on the display screen 302*a* (402*a*) and allows entry of an instruction corresponding to an icon or the like displayed at that point at that time.

In addition, the main section 301 (401) has, on the outside, a flexible disk insertion slot 301*a* (401*a*) through which a flexible disk (not shown) is loaded and a CD-ROM insertion slot 301*b* (401*b*) through which a CD-ROM 700 is loaded. Furthermore, the main section 301 (401) incorporates a flexible disk drive and a CD-ROM drive that drive and access the flexible disk and the CD-ROM 700 loaded through the insertion slots 301*a* (401*a*) and 301*b* (401*b*), respectively.

Figure 2:
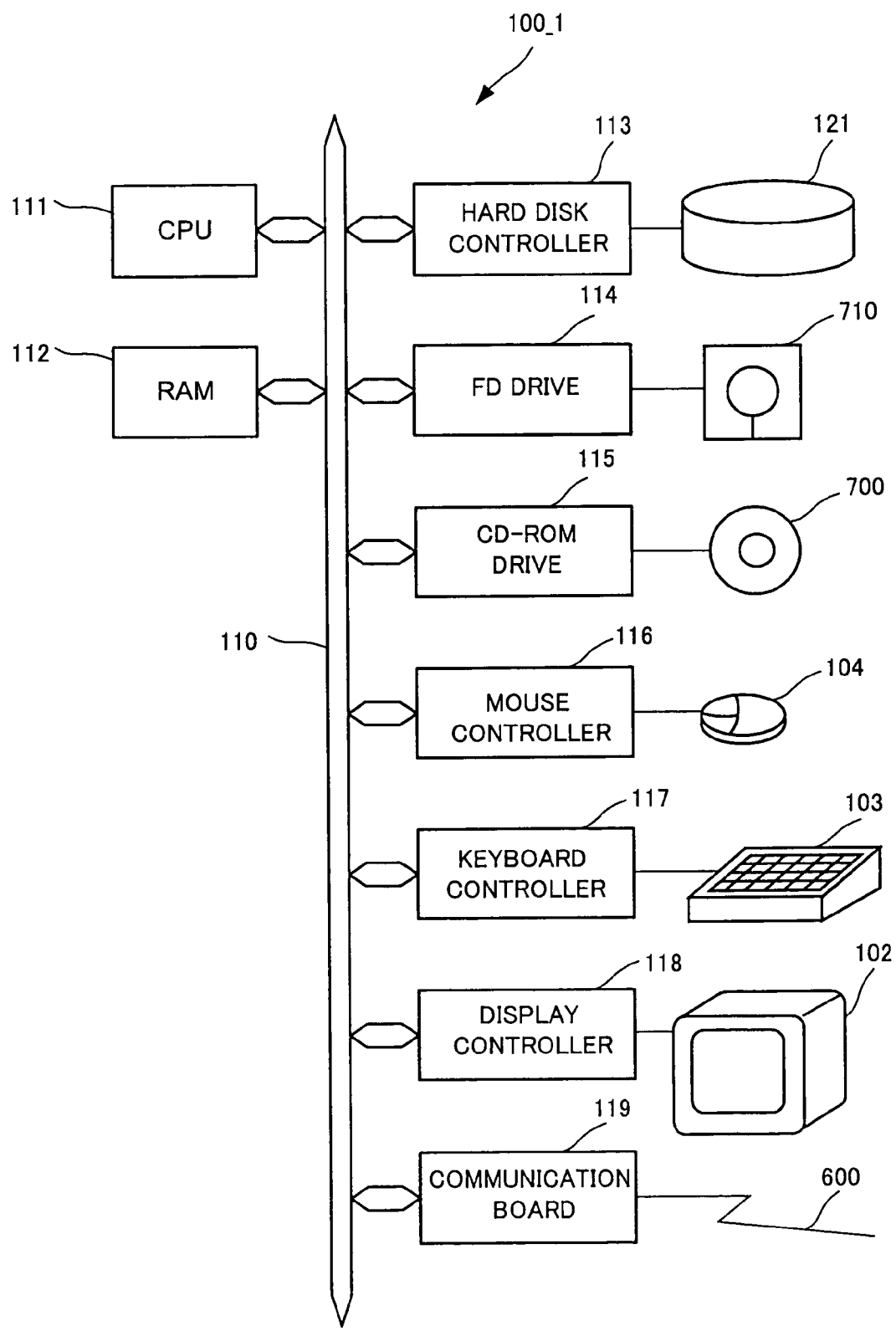
FIG. 2 shows a hardware configuration of a computer having an appearance shown in FIG. 1.

FIG. 2 shows a hardware configuration of the computers having the appearances shown in FIG. 1. In the following, the computer 100_1 will be described as a representative example. However, the computers 100_2, 100_3, 100_4, 300 and 400 have the same configuration.

In the hardware configuration view of FIG. 2, there are shown a CPU 111, an RAM 112, a hard-disk controller 113, a flexible disk drive 114, a CD-ROM drive 115, a mouse controller 116, a keyboard controller 117, a display controller 118 and a communication board 119, which are connected to each other via a bus 110.

As described with reference to FIG. 1, the flexible disk drive 114 and the CD-ROM drive 115 are to access a flexible disk 710 and the CD-ROM 700 loaded through the flexible disk insertion slot 101*a* and the CD-ROM insertion slot 101*b*, respectively. The communication board 119 is connected to the communication line 600.

In addition, FIG. 2 shows a hard disk 121 accessed by the hard disk controller 113, the mouse 104 controlled by the mouse controller 116, the keyboard 103 controlled by the keyboard controller 117, and the display section 102 (CRT display) controlled by the display controller 118.

Figure 3:
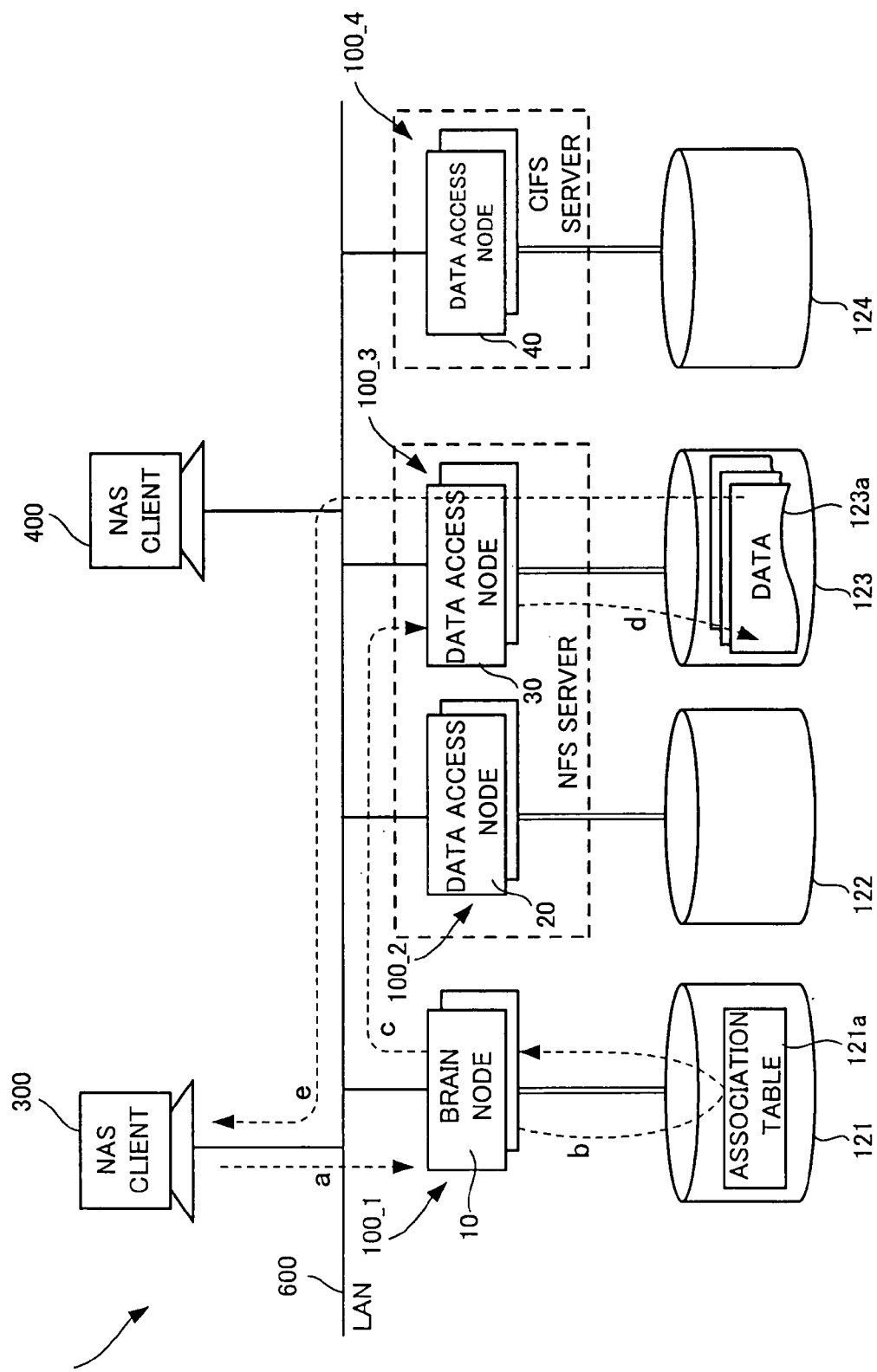
FIG. 3 shows a configuration of the data file system shown in FIG. 1.

FIG. 3 shows a configuration of the data file system shown in FIG. 1.

The computers 300 and 400 are NAS client computers that perform data transfer according to the NFS protocol, CIFS protocol or the like to/from the computers 100_1, 100_2, 100_3 and 100_4 via the communication line 600 in response to a user manipulation.

The computer 100_1 is composed of a brain node 10 and the hard disk 121. The computer 100_2 is composed of a data access node 20 that performs data transfer according to the NFS protocol and a hard disk 122. The computer 100_3 is composed of a data access node 30 that performs data transfer according to the NFS protocol and a hard disk 123. The computer 100_4 is composed of a data access node 40 that performs data transfer according to the CIFS protocol and a hard disk 124. The hard disk 121 stores an association table 121a described later. In addition, the hard disk 123 stores data 123a. The hard disks 122 and 124 stores data similar to the data 123a. For higher operation reliability, the brain node 10 and the data access nodes 20, 30 and 40 may each have an operation-standby-type cluster configuration constituted by two or more nodes.

Figure 4:
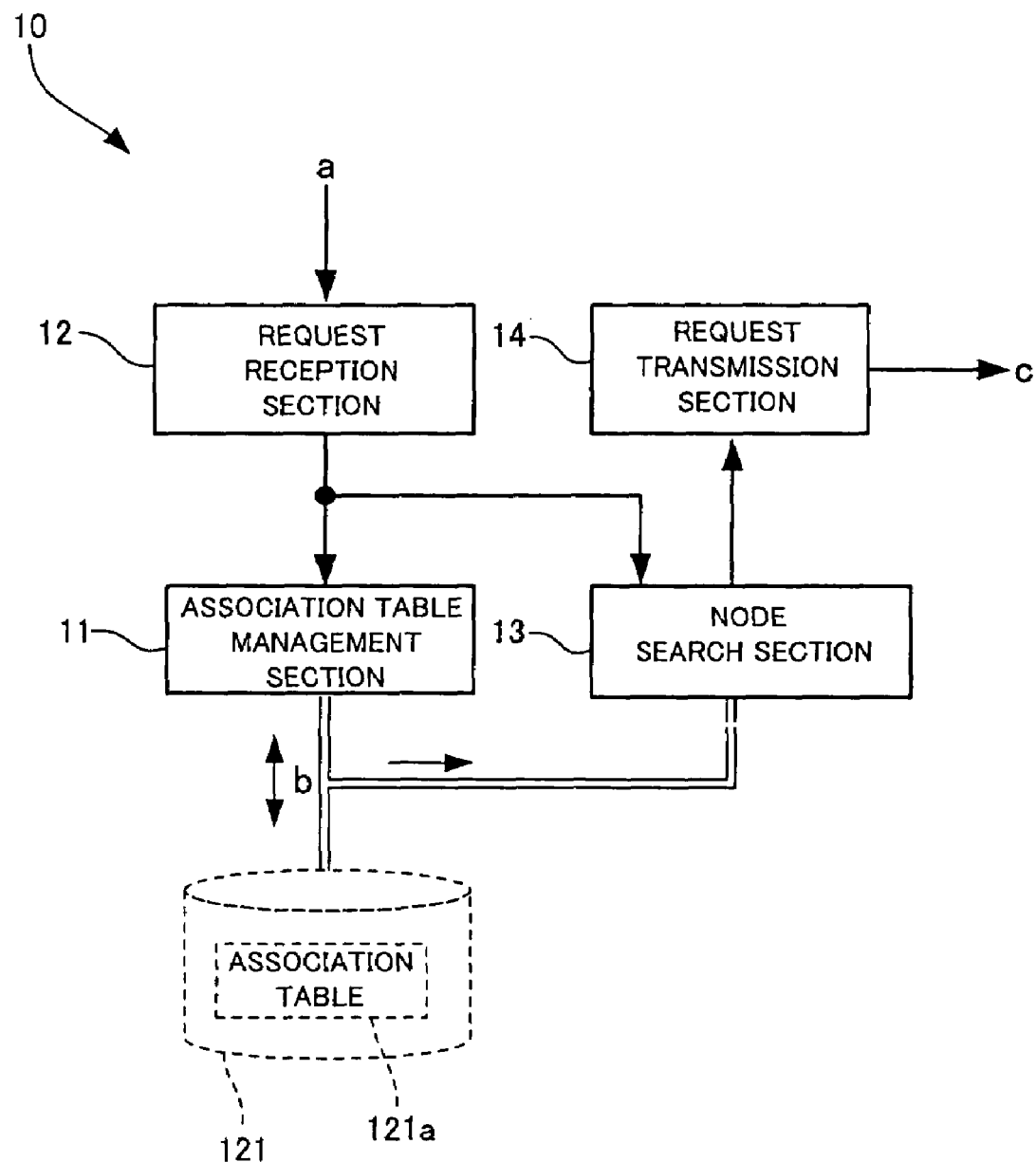
FIG. 4 shows a configuration of a brain node shown in FIG. 3.

FIG. 4 shows a configuration of the brain node shown in FIG. 3, and FIG. 5 shows an association table managed by an association table management section of the brain node shown in FIG. 4.

The brain node 10 shown in FIG. 4 has an association table management section 11, a request reception section 12, a node search section 13 and a request transmission section 14.

The association table management section 11 accesses the association table 121a in the hard disk 121 via a path b, thereby managing the association table 121a.

The association table 121a shown in FIG. 5 contains node IDs (1, 2 and 3) that discriminates among the data access nodes 20, 30 and 40, and data IDs (1001, . . . , 1999; 2001, . . . , 2999; 3001, . . . 3999) that identify data that can be accessed by the data access nodes identified by the node IDs (1, 2 and 3). Furthermore, the association table 121a contains protocol IDs (NFS, NFS and CIFS) that identify the access protocols used by the data access nodes identified by the node IDs (1, 2 and 3) and bit information that indicate whether the pair of data access node 20 and the hard disk 122, the pair of data access node 30 and the hard disk 123 and the pair of the data access node 40 and the hard disk 124, which are associated with the node IDs (1, 2 and 3), respectively, are valid (1) or invalid (0) for the system. In other words, the association table 121a contains bit information that indicates whether the computers 100_2, 100_3 and 100_4 are powered on or not.

The request reception section 12 receives a data access request a from the NAS client computers 300 and 400.

The node search section 13 refers to the association table 121a to search for a data access node that can access the data for which the data access request a is intended.

The request transmission section 14 transmits a data access request c to the data access node that can access the data for which the data access request a is intended. Besides, if the data access request a received by the request reception section 12 is a request to create a new data file, the request transmission section 14 transmits the data access request a to a data access node that uses the access protocol suitable for the protocol of the data access request a.

In this way, since the brain node 10 receives the data access requests a from the clients at one request reception section 12, the plural data access nodes 20, 30 and 40 look like one node for the clients, and each data access request a from the clients is assigned to a data access node that can access the data for which the data access request a is intended by referring to the association table 121a. Thus, compared to conventional techniques for conducting arbitration among access requests from plural servers, the brain node 10 is burdened relatively lightly, and therefore, the access performance is improved, and the response to the data access requests from the clients is improved.

In addition, since, if the data access request a is a request to create a new data file, the request transmission section 14 transmits the data access request a to a data access node that uses the access protocol suitable for the protocol of the data access request a, the protocol supported by each data access node, that is, each server is fixed. Thus, the NAS protocol including the NFS protocol and the CIFS protocol which allows the NAS client computers 300 and 400 to access the data stored in the hard disks 122, 123 and 124 via the communication line 600 is controlled in a more simplified manner. Therefore, the arbitration process among different protocols has not to be conducted consciously, the arbitration process among the NAS protocols is simplified, and a computer using any protocol can be readily added to or removed from the system.

Furthermore, since the association table 121a contains the bit information that indicates whether the pairs of data access node and hard disk associated with the node IDs are valid or invalid, the brain node 10 can readily know which data access node is currently in operation. Furthermore, when creating a new data file, a computer composed of a pair of data access node and hard disk can be readily added to the system or removed from the system (the server can be opened).

Figure 6:
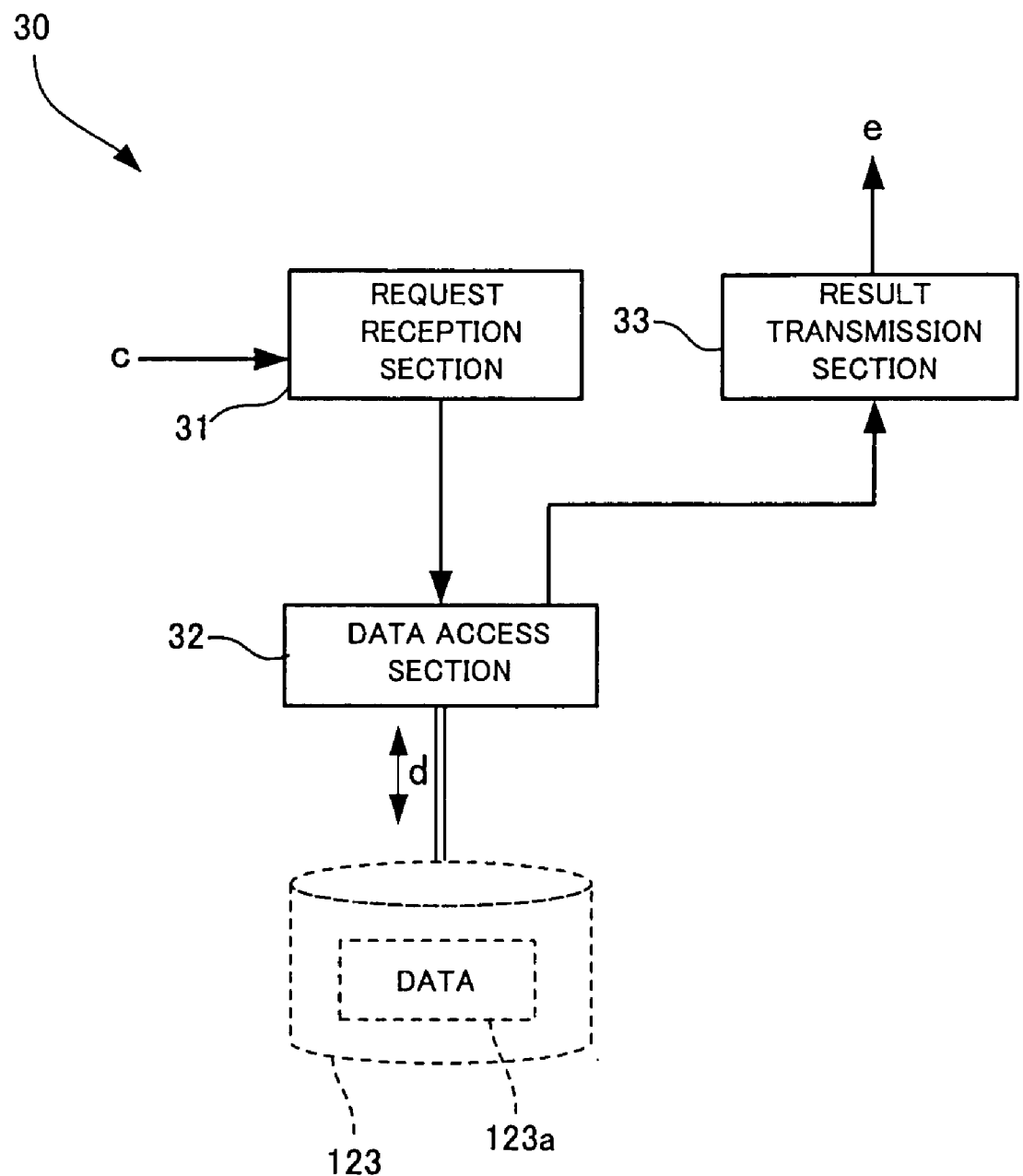
FIG. 6 shows a configuration of a data access node shown in FIG. 3.

FIG. 6 shows a configuration of the data access node shown in FIG. 3. While the data access node 30 will be described as a representative example herein, the data access nodes 20 and 40 have the same configuration.

The data access node 30 shown in FIG. 6 is a software server which accesses the data 123a stored in the hard disk 123 which the node is responsible for accessing. The data access node 30 has a request reception section 31, a data access section 32 and a result transmission section 33.

The request reception section 31 receives the data access request c transmitted from the brain node 10 (see FIG. 3).

According to the data access request c received by the request reception section 31, the data access section 32 accesses the data 123a stored in the hard disk 123 via a path d. In addition, the data access section 32 acquires a file attribute or a lock represented by the data designated by the data access request c.

The result transmission section 33 transmits a result e of the data access by the data access section 32 to the client that had made the data access request.

On the NAS protocol including the NFS protocol and the CIFS protocol, the Internet protocol (IP) address of the request sending party and the IP address of the answering party may be different, so that the data access node that is made responsible for processing in response to the data access request c can transmit the data access result e directly to the client.

The data access node 30 accesses the data which the node is responsible for accessing and transmits the access result to the requesting client. Therefore, it is sufficient that the data access node 30 accesses only the data files thereof and conducts arbitration only among the access requests to the data files thereof. Thus, distributed processing is realized in the whole system, and the system performance is improved. In addition, since addition of another data access node promotes distributed processing, the scale of the system can be readily enlarged while maintaining high system performance (higher scalability is provided). Now, an exemplary operation of the data file system 1 shown in FIG. 3 will be described with reference to FIGS. 7 and 8.

Figure 7:
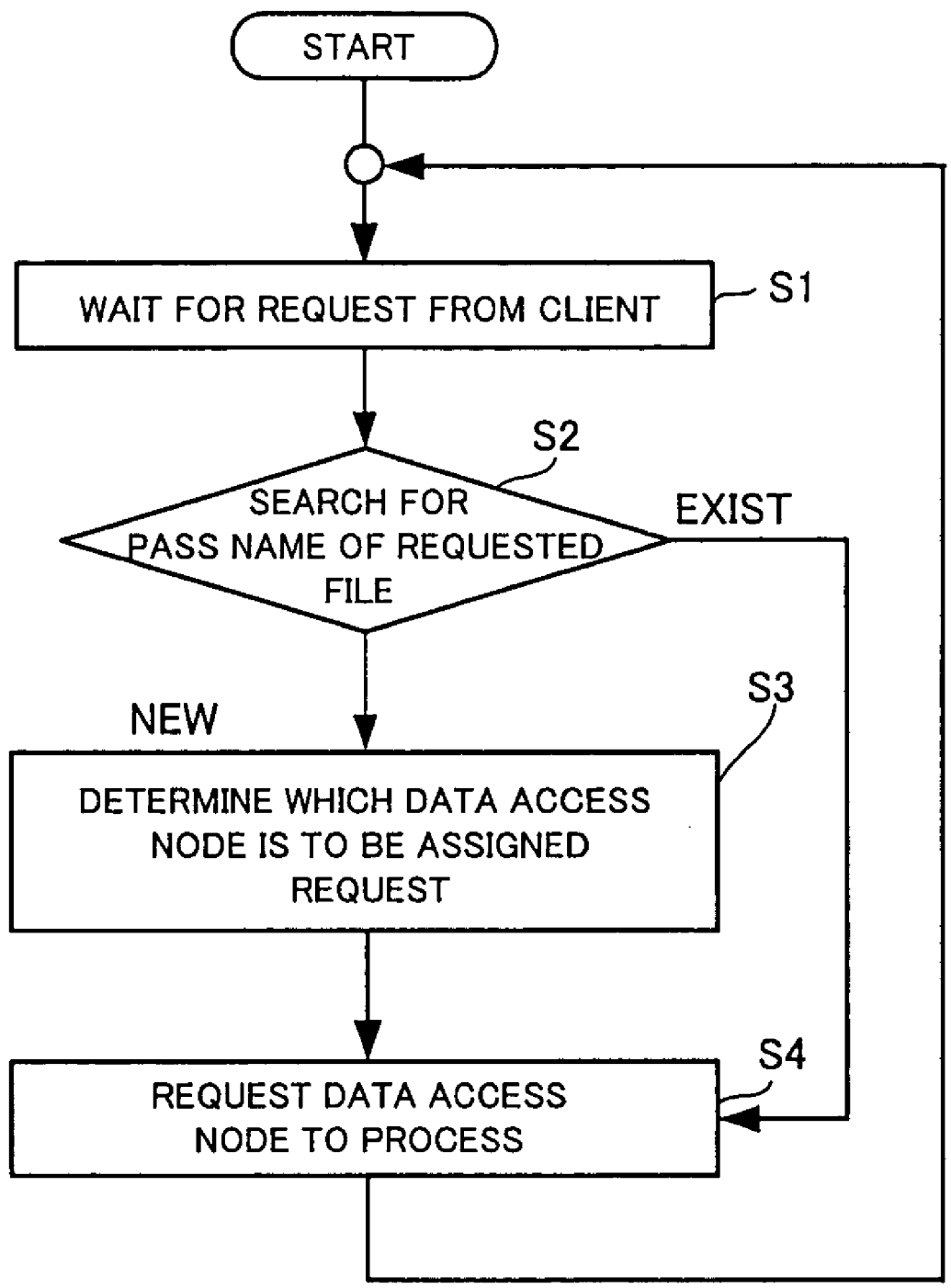
FIG. 7 is a flowchart of a processing routine in the brain node.

FIG. 7 is a flowchart of a processing routine in the brain node.

First, as shown, in step S1, the brain node 10 waits for a request from the NAS client computer 300 or 400. Here, it is assumed that the computer 300 shown in FIG. 3 makes a data access request a. Then, the process proceeds to step S2.

In step S2, the brain node searches for a pass name of the file requested. Specifically, the brain node refers to the association table 121a described above to search for a data ID which is the pass name of the requested file. If the pass name of the requested file exists, the process proceeds to step S4, where the brain node requests the data access node having the pass name to conduct processing, and then, the process returns to step S1. On the other hand, if the pass name of the requested file doesn't exist, the process proceeds to step S3.

In step S3, the data ID of the requested file is newly added to the association table 121*a*, thereby determining a data access node which is to be assigned the request, and then, the process proceeds to step S4. In step S4, the brain node requests the determined data access node to conduct processing, and then, the process returns to step S1.

Figure 8:
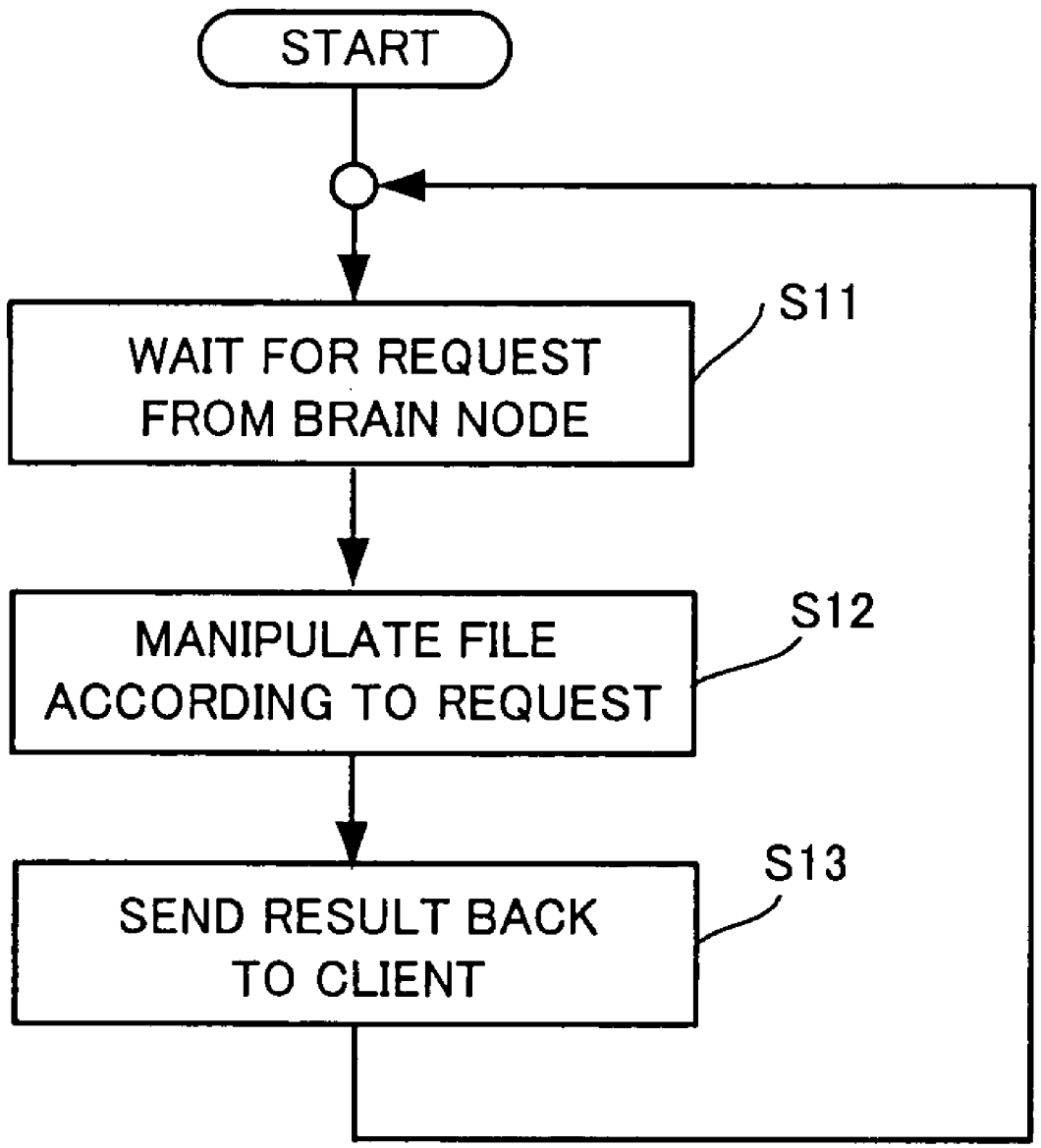
FIG. 8 is a flowchart of a processing routine in the data access node.

FIG. 8 is a flowchart showing a processing routine in the data access node.

First, as shown, in step S11, the data access node 30 waits for a request from the brain node 10. then, if the data access node 30 receives a processing request from the brain node 10, the process proceeds to step S12.

In step S12, the data access node conducts file manipulation according to the request from the brain node 10. Specifically, the data access node 30 accesses the data in the hard disk 123. In addition, it acquires the file attribute and the lock, which is the right to use the file exclusively.

Then, in step S13, the data access result e is transmitted back to the computer 300 which had made the data access request a, and then, the process returns to step S11.

Figure 12:
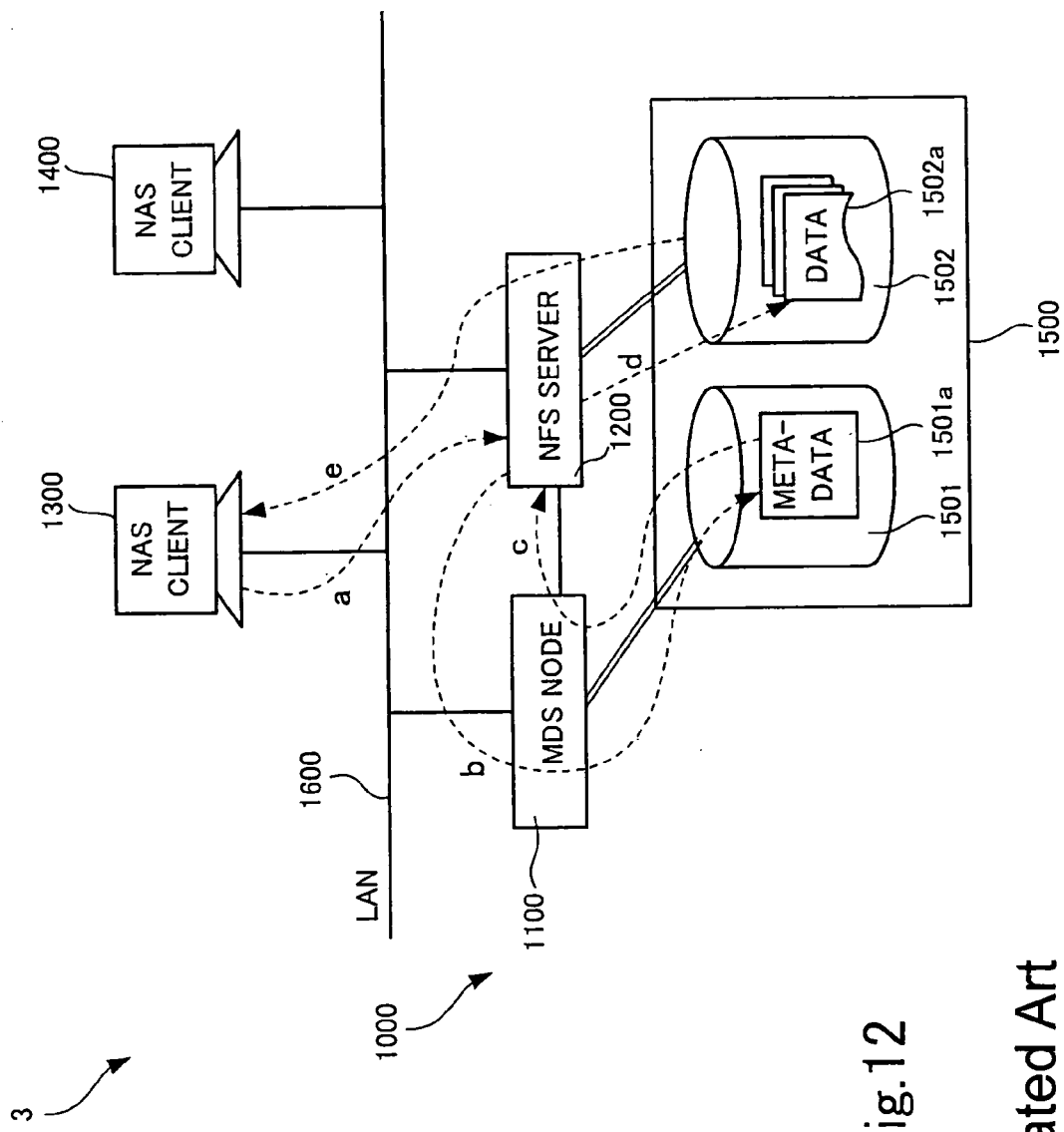
FIG. 12 shows a configuration of a conventional simultaneous data sharing type data file system.

As described above, in the data file system 1 according to the first embodiment, the brain node 10 serves to transmit the data access request c to the data access node 30 which can access the data for which the data access request a from the NAS client computer 300 is intended, and the data access node 30 serves to access the data designated by the data access request c transmitted from the brain node 10 and transmit the result to the requesting NAS client computer 300. In other words, the brain node 10 serves only to assign the request a from the NAS client computer 300 to the data access node 30 associated with the request a, and the data access node 30 serves only to access the data which the node is responsible for accessing of the whole data of the system. In this way, the brain node 10 and the data access node 30, which are software servers, are responsible for different functions, and the data access nodes 20, 30 and 40 divide access processing among them. Therefore, compared to the conventional technique described above with reference to FIG. 12, the processing speed is improved.

In addition, for system maintenance or configuration modification, it is sufficient to halt only the paired data access node and hard disk for which such maintenance or modification is to be done, and there is no need to halt the whole system.

Figure 9:
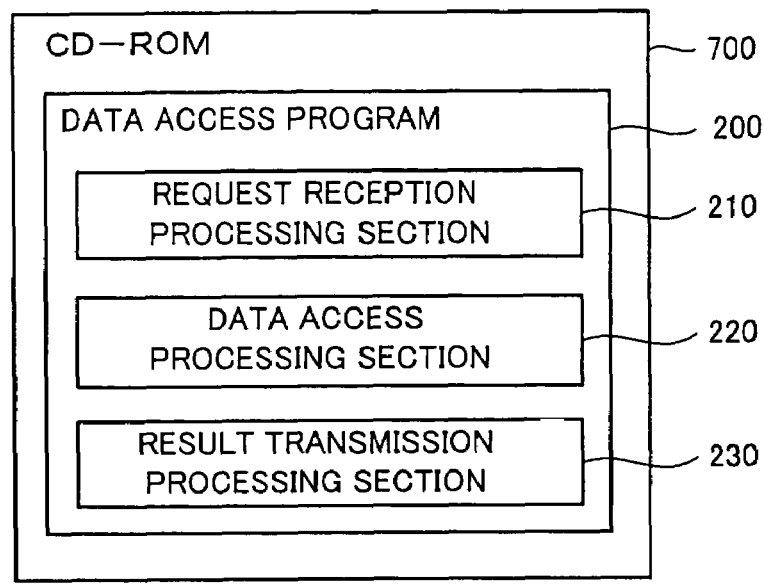
FIG. 9 is a conceptual diagram of a data access program which is stored in a data access program storage medium according to an embodiment of the present invention and makes a computer operate as the data access node.

FIG. 9 is a conceptual diagram of a data access program that is stored in a data access program storage medium according to an embodiment of the present invention and makes a computer to operate as a data access node.

The data access program runs on the computers 100_2, 100_3 and 100_4 (an example of an information processing device according to the present invention) which allows the program to run and makes the computers 100_2, 100_3 and 100_4 operate as data access nodes which access the data which the nodes are responsible for accessing respectively.

A data access program 200 shown in FIG. 9 is composed of a request reception processing section 210, a data access processing section 220 and a result transmission processing section 230 and is stored in the CD-ROM 700 shown in FIGS. 1 and 2.

The data access program 200 shown in FIG. 9 is installed from the CD-ROM 700 to the computers 100_2, 100_3 and 100_4 shown in FIG. 1 and then provides the operations of the data access nodes 20, 30 and 40.

The request reception section 31 of the data access node 30 shown in FIG. 6, which operates under the control of the request reception processing section 210 of the program, receives the data access request c transmitted from the brain node 10.

The data access section 32, which operates under the control of the data access processing section 220 of the program, accesses, via the path d, the data 123*a* stored in the hard disk 123 according to the data access request c received at the request reception section 31.

The result transmission section 33, which operates under the control of the result transmission processing section 230 of the program, transmits the result of the data access e by the data access section 32 to the client that had made the data access request.

As described above, since the data access program 200 according to this embodiment runs on the computers 100_2, 100_3 and 100_4 to make the computers 100_2, 100_3 and 100_4 operate as data access nodes which access the data which the nodes are responsible for accessing respectively. Therefore, each of the data access nodes can operate in such a manner that the node accesses the data which it is responsible for accessing and transmits the access result to the requesting client. Therefore, it is sufficient that the data access nodes access only their respective data files and conducts arbitration only among the data access requests to their respective data files. Thus, distributed processing is realized in the whole system, and the system performance is improved.

Figure 10:
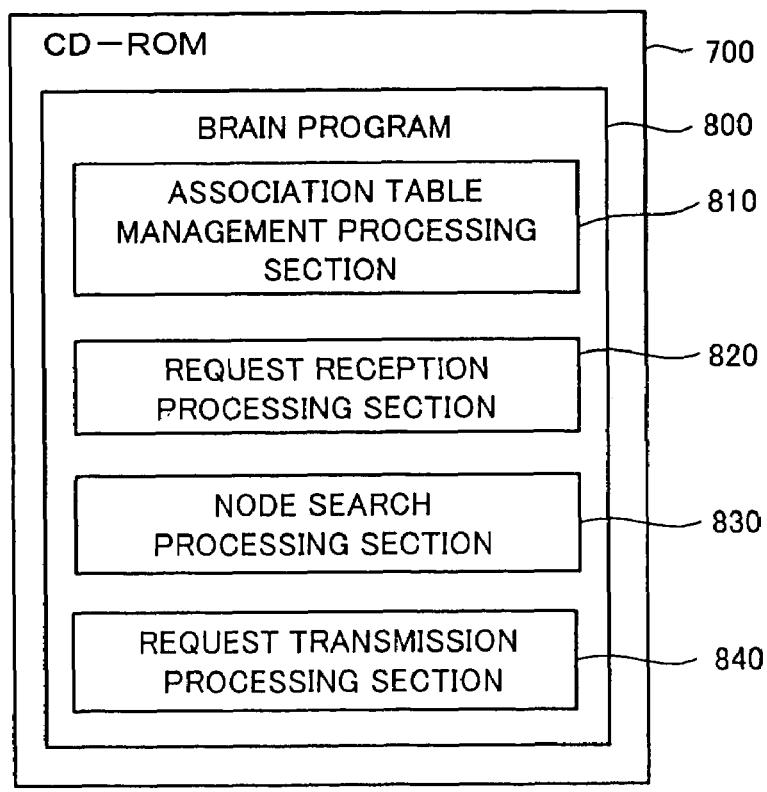
FIG. 10 is a conceptual diagram of a brain program which is stored in a brain program storage medium according to an embodiment of the present invention and makes a computer operate as the brain node.

FIG. 10 is a conceptual diagram of a brain program that is stored in a brain program storage medium according to an embodiment of the present invention and makes a computer operate as a brain node.

The brain program runs on the computer 100_1 (an example of the information processing device according to the present invention) which allows the program to run and makes the computer 100_1 operate as a brain node, which is connected to the plural data access nodes 20, 30 and 40 which are responsible for accessing their respective data and transmits a data access request to one of the plural data access nodes 20, 30 and 40 which is responsible for accessing the desired data.

A brain program 800 shown in FIG. 10 is composed of an association table management processing section 810, a request reception processing section 820, a node search processing section 830 and a request transmission processing section 840 and is stored in the CD-ROM 700 shown in FIGS. 1 and 2.

The brain program 800 shown in FIG. 10 is installed from the CD-ROM 700 to the computer 100_1 shown in FIG. 1 and then provides the operation of the brain node 10.

Specifically, the association table management section 11 of the brain node 10 shown in FIG. 4, which operates under the control of the association table management processing section 810 of the program, accesses the association table 121*a* in the hard disk 121 via the path b, thereby managing the association table 121*a*.

The request reception section 12, which operates under the control of the request reception processing section 820 of the program, receives the data access request a from the NAS client computers 300 and 400.

The node search section 13, which operates under the control of the node search processing section 830 of the program, refers to the association table 121*a* to search for a data access node which can access the data for which the data access request a is intended.

The result transmission section 14, which operates under the control of the result transmission processing section 840 of the program, transmits the data access request c to the data access node which can access the data for which the data access request a is intended. In addition, if the data access request a received at the request reception section 12 is a request to create a new data file, the request transmission section 14 transmits the data access request a to the data access node which uses the access protocol suitable for the protocol of the data access request a.

As described above, since the brain program 800 according to this embodiment runs on the computer 100_1 to make the computer 100_1 operate as a brain node 10 which is connected to the plural data access nodes 20, 30 and 40 which are responsible for accessing their respective data and transmits a data access request to one of the plural data access nodes 20, 30 and 40 which is responsible for accessing the desired data. Therefore, the brain node operates in such a manner that it transmits the data access request to the data access node which can access the data designated by the data access request from the client. Therefore, the brain node 10 transmits (assigns) the data access request to the data access node that can access the data for which the data access request from the client is intended, so that the brain node 10 is burdened relatively lightly. Thus, the access performance is improved, and the response to the data access request from the client is improved.

Figure 11:
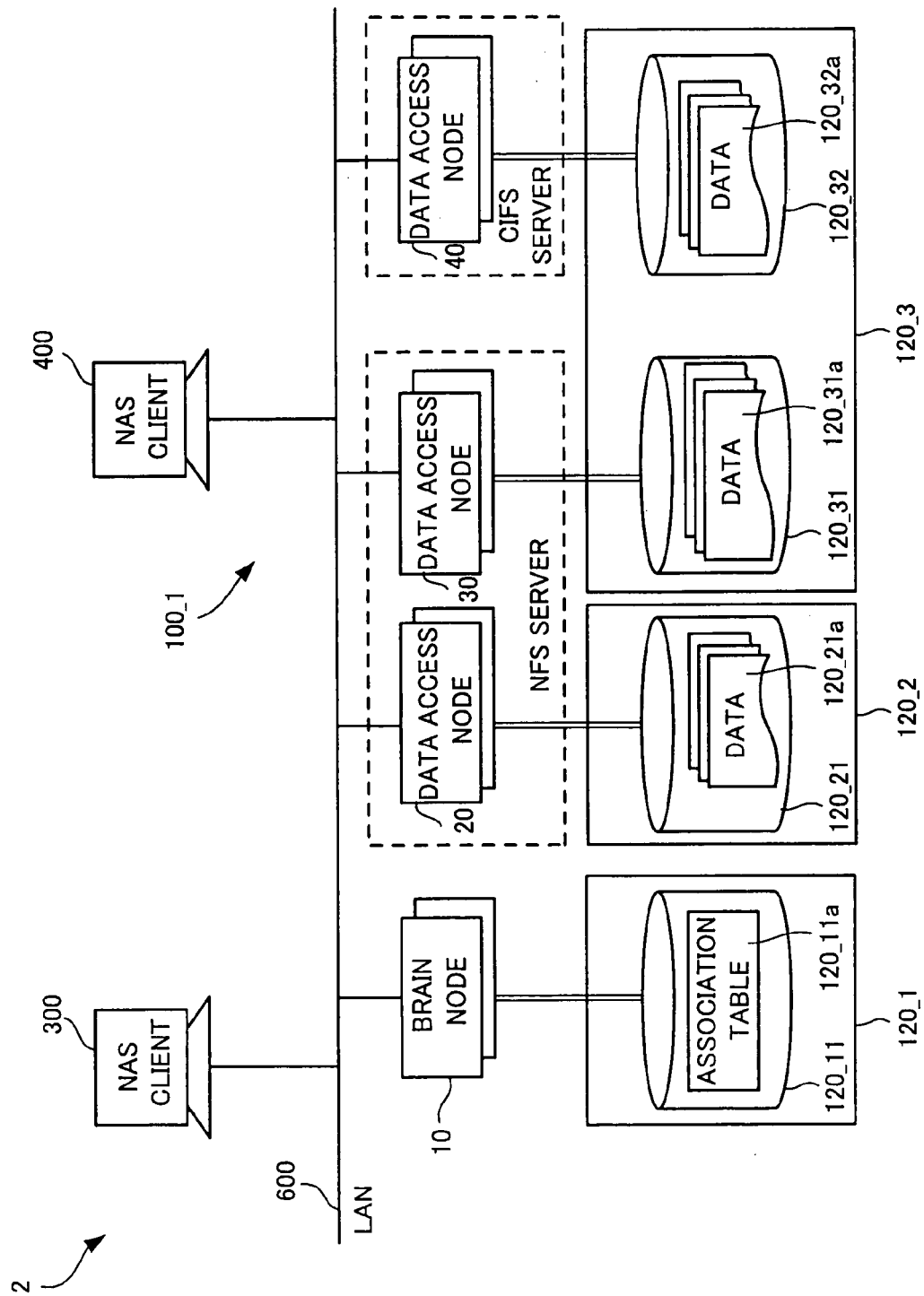
FIG. 11 shows a configuration of a data file system according to a second embodiment of the present invention.

FIG. 11 shows a configuration of a data file system according to a second embodiment of the present invention.

The same components as those of the data file system 1 shown in FIG. 3 are assigned the same reference numerals, and the description thereof will be omitted.

A data file system 2 shown in FIG. 11 has a disk device 120_1 connected to a brain node 10, a disk device 120_2 connected to a data access node 20, and a disk device 120_3 connected to two data access nodes 30 and 40.

The disk device 120_1 has a hard disk 120_11 storing an association table 120_11a. The disk device 120_2 has a hard disk 120_21 storing data 120_21a. The disk device 120_3 has a hard disk 120_31 storing data 120_31a and a hard disk 120_32 storing data 120_32a.

The data 120_31a stored in the hard disk 120_31 of the disk device 120_3 is accessed by the data access node 30, which performs data transfer according to the NFS protocol, and the data 120_32a stored in the hard disk 120_32 is accessed by the data access node 40, which performs data transfer according to the CIFS protocol. In this way, one disk device 120_3 may have both the data region accessed according to the NFS protocol and the data region accessed according to the CIFS protocol.

What is claimed is:

1. A data file system, comprising:
a plurality of data access nodes which access data which the data access nodes are responsible for accessing respectively;
and a brain node having:
an association table management section which manages an association table which describes an association between node IDs for discriminating among the plurality of data access nodes and data IDs each for identifying data which a data access node identified by a node ID is capable of accessing;
a request reception section which receives a data access request from a client;
a node search section which refers to the association table to search for a data access node which is capable of accessing the data for which the data access request is intended;
and a request transmission section which transmits the data access request to the data access node which is capable of accessing the data for which the data access request is intended, wherein each of the plurality of data access nodes has:

a request reception section which receives the data access request transmitted from the brain node;
a data access section which accesses the data designated by the data access request received at the request reception section of each of the data access nodes;
and a result transmission section which transmits the result of the data access by the data access section to the client which has made the data access request.

2. The data file system according to claim 1, wherein the association table management section manages an association table that describes an association between the node IDs and protocol IDs each for identifying an access protocol used by a data access node identified by a node ID in addition to the association between the node IDs and the data IDs, and if the data access request received by the request reception section is a request to create a new data file, the request transmission section transmits the data access request to a data access node that uses an access protocol suitable for the protocol of the data access request.

3. A brain program storage medium:
storing a brain program which runs on an information processing device allowing a program to run and makes the information processing device operate as a brain node which is connected to a plurality of data access nodes which access data which the data access nodes are responsible for:
accessing respectively and transmits a data access request to a data access node of the plurality of data access nodes which is responsible for accessing a desired data, wherein the brain program makes the information processing device operate as a brain node having:
an association table management section which manages an association table which describes an association between node IDs for discriminating among the plurality of data access nodes and data IDs each for identifying data which a data access node identified by a node ID is capable of accessing;
a request reception section which receives a data access request from a client;
a node search section which refers to the association table to search for a data access node which is capable of accessing the data for which the data access request is intended;
and a request transmission section which transmits the data access request to the data access node which is capable of accessing the data for which the data access request is intended.

4. The brain program storage medium according to claim 3, wherein the association table management section manages an association table that describes an association between the node IDs and protocol IDs each for identifying an access protocol used by a data access node identified by a node ID in addition to the association between the node IDs and the data IDs, and if the data access request received by the request reception section is a request to create a new data file, the request transmission section transmits the data access request to a data access node that uses an access protocol suitable for the protocol of the data access request.

* * * * *